UNITED STATES PATENT OFFICE.

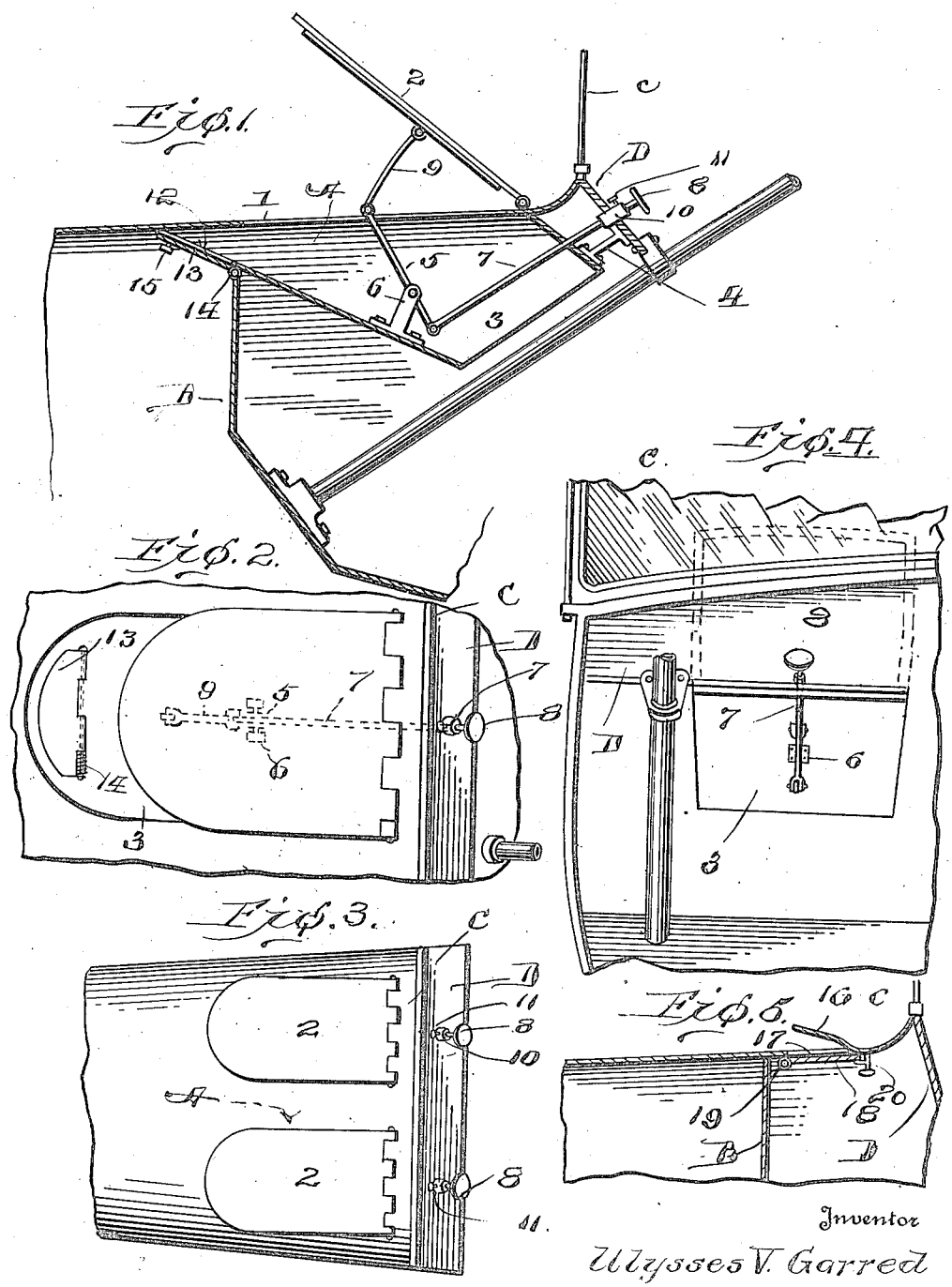

ULYSSES VICTORIA GARRED, OF ILION, NEW YORK.

MEANS FOR VENTILATING AND HEATING AUTOMOBILE-BODIES.

1,277,404.   Specification of Letters Patent.   Patented Sept. 3, 1918.

Application filed November 9, 1917.  Serial No. 201,154.

*To all whom it may concern:*

Be it known that I, ULYSSES V. GARRED, a citizen of the United States, residing at Ilion, in the county of Herkimer and State of New York, have invented a certain new and useful Means for Ventilating and Heating Automobile-Bodies, of which the following is a specification.

This invention relates to means for ventilating and heating an automobile body.

It is well known that the extreme temperatures of the seasons cause more or less discomfort while riding in an automobile, particularly of the open body type.

The object of the present invention is to ventilate the body of the automobile from the heat of the engine in warm seasons, and to shunt the hot air from the engine into the body of the car in cold seasons.

The invention contemplates providing a simple, cheap and effective means to accomplish the purposes of the invention, which is readily applicable to automobiles of varying designs and may be arranged in different forms and positions for the varying designs and constructions of vehicle-bodies as long as the principles of the invention are practised.

With the above aims and objects in view, the invention consists in the novel construction and combination of parts and in sundry details of construction, which will be set forth in the following specification and pointed out in the appended claims.

In the drawings which illustrate the invention:

Figure 1 is a longitudinal vertical section through a car body equipped with the invention, only enough of the car body being shown to illustrate the application of the invention.

Fig. 2 is a fragmentary plan of Fig. 1.

Fig. 3 is a plan view of a hood portion of an automobile showing a slight variation from the showing of Figs. 1 and 2.

Fig. 4 is an enlarged fragmentary end view looking from within the automobile.

Fig. 5 is a fragmentary, longitudinal vertical section view of an automobile body showing a further modification of the invention.

In the drawings, A denotes the cowl which extends rearwardly from the dashboard B of an automobile in order to overhang a portion of the space between the dash-board and the front seat of the vehicle. A wind shield C and an instrument-board D are shown as positioned at the rear edge of the cowl, as is usual.

An opening 1 is formed in the cowl, preferably at the top thereof, and a cover 2 is hinged to the rear edge of the opening 1 in a manner that will permit it to swing or open outwardly. The opening 1 may be of any desired formation, but is shown preferably as substantially rectangular, and the cover is suitably provided with means at its edges to form a tight joint to prevent leakage of water into the cowl when the cover is closed. There may be one of these openings 2 arranged at the center of the top portion of the cowl, as showing in Figs. 1 and 2; or there may be two openings 1, one arranged in the top on the right and left of the middle line of the car, as shown in Figs. 3 and 4. It may be found desirable, on some automobile bodies, to form the openings in the side portions of the cowl A, but, in any event, the openings are to be large enough to admit air freely therethrough.

A conduit 3, of any desirable and approved formation in cross-section, is provided to direct air from the opening 1 to a desired point below the instrument board D in order to ventilate the front portion of the car body. The conduit has one end cut substantially diagonally and is fittedly engaged and secured, in any suitable manner, to the under side of the cowl A so as to embrace an opening 1 and to extend downwardly with a rearward slant from the opening to a point below the instrument board D. The lower end of the conduit is secured to the board D by a supporting bracket 4.

In order to raise and lower the cover 2, which, when raised, acts as a deflector for directing the air into the conduit 3, a lever 5 is provided and is pivoted intermediate its ends to a bracket 6 secured to the bottom wall of the conduit. One end of the lever 5 is connected to an operating rod 7 slidably extended through a wall of the conduit and through the instrument board D, there it terminates in a push head or grasping piece 8. A link 9 pivotally connects the other end of the lever with the cover so that when the rod 7 is reciprocated the cover will be raised and lowered. The cover may be retained in a desired elevated position by providing a bushing 10 about the rod 7 at the panel board and having a thumb screw 11 or some other suitable means carried by the bushing which will bind and hold the rod in an adjusted position; thus the amount of air admitted into the cowl may be readily regulated at will by the operator of the vehicle.

As will be noticed particularly from Figs. 1 and 2, a portion 12 of the forward end of the conduit, by virtue of its peculiar formation, extends through an opening in the dash-board B to within the engine chamber. This extended end portion 12 is formed with an opening closed by a hinged shutter 13 and a spring 14 is provided to urge and hold the shutter in open position. In the present instance the shutter is shown on the bottom wall of the conduit and is maintained in closed position by a suitable catch 15 of any desired construction. Consequently, it will be obvious that this construction will also permit the warm air, which is blown off the engine to be shunted into the car body through the conduits 3 for keeping the occupants warm, when the cover 2 is closed and the shutter 13 is opened.

In Fig. 5, there is shown a modified form of the invention wherein a semi-circular or angular slit is formed in the cowl A and portions adjacent the slit are stamped or pressed outwardly to form a shield or cover 16 for an opening 17 formed thereby. Such openings 17 may be arranged singly or in groups of any number, although the shields 16 are to be so arranged as to act as deflector for directing air in the cowl especially when the vehicle is moving, the amount of air admitted being regulated by a shutter 18 hinged to the front edge of each opening as at 19. A suitable catch or latch 20 is provided to maintain the shutter 19 in closed position. With this form of the invention the conduit 3 may or may not be used, as desired.

In all cases the covers 2 and shields 16 are to be graceful in design, and in such instances as are necessary the covers 2 are to have pleasing corrugation as will suit the make of the car and match the usual corrugations thereof.

From the foregoing it will be seen that an automobile body may be readily ventilated or heated, as occasion requires. It is, however, to be understood that the construction herein shown may be changed or altered within the legitimate scope of the appended claims and within the limits of mechanical practibility.

I claim:

1. A device of the kind described, comprising a conduit having one end cut angularly to fit the under face of an overhanging cowl of an automobile and to extend downwardly therefrom, said conduit being adapted to receive a current of air from an opening in the cowl and having a portion of said angularly cut end to extend into the engine chamber of the vehicle and to communicate with said chamber, and means for controlling the passage of air into said conduit from said opening and engine chamber.

2. A device of the character described comprising in combination with a vehicle body having an overhanging cowl with an opening therein and having an instrument-board, of a conduit extending from opening to a point adjacent the floor of the vehicle, a hinged cover for said opening and acting as a deflector for directing air into said opening and through said conduit, a bracket secured within the conduit, a lever pivoted intermediate its ends to the bracket, a rod slidably extended through the conduit and adapted to extend through said instrument board body, said rod being connected to one end of the lever and having the end extending through said instrument board terminating in a handle portion, a link connecting the other end of the lever with said cover, whereby the latter may be opened and closed by reciprocating said rod, and means to be arranged at the instrument board for securing said rod in adjusted position, whereby the open position of the cover may be adjusted to varying degrees.

In testimony whereof I affix my signature, in the presence of two witnesses.

ULYSSES VICTORIA GARRED.

Witnesses:
R. F. LEWIS,
HARRY WOOD.